US009436577B2

(12) United States Patent
Rabin et al.

(10) Patent No.: US 9,436,577 B2
(45) Date of Patent: Sep. 6, 2016

(54) SYSTEM AND METHOD FOR GENERATING A CODE EXECUTION TIMELINE FROM AN EXECUTING PROGRAM

(71) Applicant: Nintendo Co., Ltd., Kyoto (JP)

(72) Inventors: Steve Rabin, Redmond, WA (US); Fernando Silva, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 156 days.

(21) Appl. No.: 14/087,586

(22) Filed: Nov. 22, 2013

(65) Prior Publication Data
US 2015/0148138 A1 May 28, 2015

(51) Int. Cl.
*G06F 9/44* (2006.01)
*G06F 11/34* (2006.01)
*A63F 13/60* (2014.01)
*G06F 11/36* (2006.01)
*G06F 11/30* (2006.01)

(52) U.S. Cl.
CPC ........... *G06F 11/3466* (2013.01); *A63F 13/60* (2014.09); *G06F 11/30* (2013.01); *G06F 11/3636* (2013.01); *A63F 2300/209* (2013.01)

(58) Field of Classification Search
CPC ............ G06F 3/0481–3/0482; G06F 9/4443; G06F 11/3466; G06F 11/3636
USPC ............ 717/101–178; 702/16; 715/700–867
See application file for complete search history.

(56) References Cited

U.S. PATENT DOCUMENTS

| | | | |
|---|---|---|---|
| 7,313,755 B2 * | 12/2007 | Rahman et al. | 715/203 |
| 7,735,018 B2 * | 6/2010 | Bakhash | 715/782 |
| 7,769,819 B2 * | 8/2010 | Lerman | G06F 17/30017 709/203 |
| 8,444,485 B2 * | 5/2013 | Collar | A63F 13/10 386/200 |
| 8,591,332 B1 * | 11/2013 | Bright | A63F 13/10 273/460 |
| 8,631,436 B2 * | 1/2014 | Arrasvuori et al. | 725/45 |
| 8,913,878 B2 * | 12/2014 | Axen et al. | 386/280 |
| 2004/0222992 A1 * | 11/2004 | Calkins et al. | 345/473 |
| 2005/0166179 A1 * | 7/2005 | Vronay et al. | 717/105 |
| 2006/0092295 A1 * | 5/2006 | Mercer | 348/239 |
| 2007/0101265 A1 * | 5/2007 | Ando et al. | 715/716 |
| 2007/0271508 A1 * | 11/2007 | Audet | 715/530 |
| 2008/0228429 A1 * | 9/2008 | Huang et al. | 702/141 |
| 2009/0055726 A1 * | 2/2009 | Audet | 715/234 |
| 2009/0077473 A1 * | 3/2009 | Williams | G06T 5/20 715/753 |

(Continued)

OTHER PUBLICATIONS

Video Game Optimization—Ben Garney and Eric Preisz—Course Technology PTR A part of Cengage Learning—2011—Printed in the United States of America.*

*Primary Examiner* — Francisco Aponte
(74) *Attorney, Agent, or Firm* — Nixon & Vanderhye, P.C.

(57) ABSTRACT

The present technology is directed to a non-limiting system and method for generating an abstract code execution timeline from repetitive programs, such as video games and simulations. As a non-limiting example, a statistical sampling profile is first taken of the running program, and then the data is converted into several representations. By selecting representative functions based on sampling frequency and call tree hierarchy and then sorting those functions chronologically and hierarchically, an abstract code execution timeline can be generated that summarizes execution within a single repetitive time period, such as a video frame. This timeline is called "Story Mode" since it tells a story of how the program executes over the course of a frame. This abstract code execution timeline can then be used to facilitate program comprehension, primarily for the purposes of modifying the code to improve execution speed.

22 Claims, 15 Drawing Sheets

(56) References Cited

U.S. PATENT DOCUMENTS

| | | | |
|---|---|---|---|
| 2009/0258700 A1* | 10/2009 | Bright | A63F 13/10 463/31 |
| 2010/0281376 A1* | 11/2010 | Meaney et al. | 715/723 |
| 2011/0066941 A1* | 3/2011 | Chipchase et al. | 715/716 |
| 2012/0030600 A1* | 2/2012 | Chandhoke et al. | 715/771 |
| 2013/0127877 A1* | 5/2013 | Blas, Jr. | G06T 13/00 345/474 |
| 2013/0132840 A1* | 5/2013 | Blas et al. | 715/719 |
| 2013/0159375 A1* | 6/2013 | Perry | H04L 67/02 709/201 |
| 2014/0075004 A1* | 3/2014 | Van Dusen et al. | 709/223 |
| 2014/0101592 A1* | 4/2014 | Costa | G06F 3/0482 715/772 |
| 2014/0289701 A1* | 9/2014 | Hamlin et al. | 717/113 |
| 2015/0033172 A1* | 1/2015 | Krajec | 715/771 |
| 2015/0121225 A1* | 4/2015 | Somasundaram | G06F 3/04842 715/721 |

\* cited by examiner

SYSTEM AND METHOD FOR GENERATING A CODE EXECUTION TIMELINE FROM AN EXECUTING PROGRAM

BACKGROUND

Timelines can be useful in helping a person to understand what happened over a period of time. A timeline can be used to show events in chronological order. For example, Facebook® employs a timeline to show a user's social events over the course of months or even years. From pictures to user posts, the events posted on the timeline tell a story. For example, a post of a couple holding a new-born baby shows that their child has recently entered the world and the family is now one person larger. A post of a person holding a diploma could indicate that she just graduated and received a degree. The timeline shows these events and can describe previous events that led up to a current event.

BRIEF DESCRIPTION OF THE DRAWINGS

The detailed description is set forth with reference to the accompanying figures.

DETAILED DESCRIPTION OF EXAMPLE NON-LIMITING EMBODIMENTS OF THE TECHNOLOGY

Figure 1A:
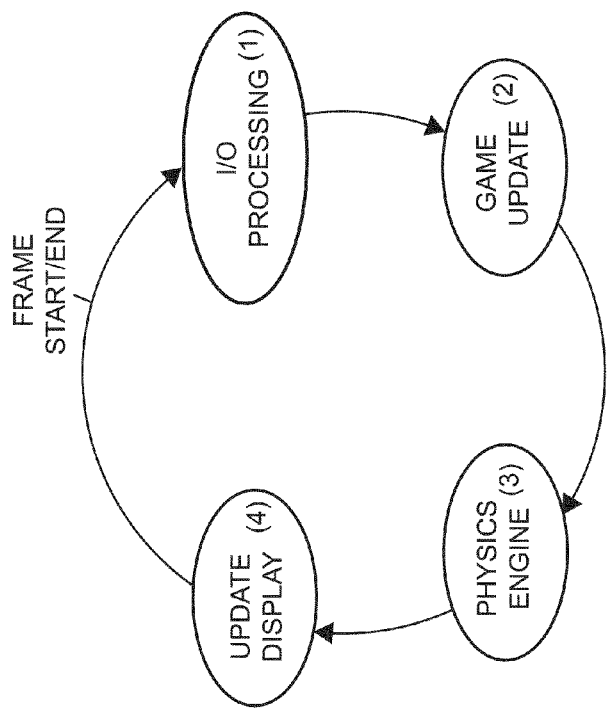
FIG. 1A shows example illustrative repetitive software processing.

Although may be not as exciting as real-life events, a running software program also has an important story to tell. This story can be used by a software developer to figure out what happens and when it happens. It can be very useful in "debugging"—finding and removing errors and inefficiencies. A running software program sometimes calls various functions and accesses various resources such as memory locations. Which functions are called when and which memory locations are accessed when, for example, can tell a story about how the program operates and what it is doing. One can understand a Facebook® timeline for a single person by viewing the user's page. But, understanding group behavior based on hundreds, or even thousands of different timelines, can be very complex. Just as the collection of hundreds or thousands of timelines would relay very little readily useful information to someone, similar challenges face conventional technology that profiles software using timelines. Some technology has used timelines to help visualize software execution. See e.g., *Techniques for Visualizing Software Execution by Seyster* (March 2008). But as software and hardware have become more complex, such timelines have become less useful. In particular, CPUs now process many concurrent functions which can embody millions of instructions per second, and multi-core processing can process many functions in parallel. These complexities create significant challenges for useful and effective visualization. The technology described herein helps address these complexities and improves upon prior techniques.

The present disclosure is directed to a non-limiting system and method for generating an abstract code execution timeline. In some embodiments, the described techniques can be used to generate the timeline from repetitive programs, such as video games and simulations. As a non-limiting example, a statistical sampling profile or series of "snapshots" of program execution is captured for the running program, and then the data is converted into several representations. By selecting representative functions based on sampling frequency and call tree hierarchy and then sorting those functions chronologically and hierarchically, useful and readable abstract code execution timelines can be generated that summarize execution within a single repetitive time period, such as the display of a video frame. This timeline feature can be called "Story Mode" since it tells a story of how the program executes over the course of a frame or other time period. This abstract code execution timeline can be used to facilitate program comprehension, e.g., for the purposes of modifying the code to improve execution speed.

This present technology uses the data from a statistical sampling profile to improve upon conventional software profiling technology. When the computer program is repetitive, the non-limiting, example techniques disclosed can be particularly useful to discover representative functions that can be specially ordered to give an informative timeline explanation of the running program.

In various software systems, such as video game and simulation programs, code executes periodically, such as at the simulation or video refresh frame rate. Within each simulation or video frame, it is expected to see a pattern of work from the beginning of the frame to the end. Some examples of this pattern of work would be to read inputs, simulate agent behavior, simulate physics, resolve collisions, and render the scene.

The timeline display of the present technology has many advantages over conventional software visualization technology. As can be seen in the progression of FIGS. 3-7, the timeline display sorts and filters the executed functions during a frame of program execution. The display essentially reads left to right over time but also from top to bottom based on the chronological and hierarchical execution of the program. For example, the listing of functions from top to bottom in FIG. 4 shows how each function executes chronologically over time as well as the hierarchical parent-to-child arrangement of the functions.

This display gives the viewer an idea as to which functions execute first and most often as well as which functions have a "greater" hierarchy based on the parent-to-child relationship between the functions. Using FIG. 4 as an example, the eye of the viewer travels both left to right and top to bottom in a diagonal direction along the visualization. Thus, much like a well taken photograph, the eye of the viewer is captured by the visualization.

By sorting the functions chronologically and hierarchically from left-to-right and top-to-bottom, the viewer also gets a better idea of the depth of program execution. In the example shown in FIG. 4, the program depth is shown as the functions descend from A to JJ. The visualization can show a greater or lesser program depth based on how far the grouping of functions descends.

The visualization of the present technology also shows clusters of program execution. For example, FIG. 4 shows execution of Functions A, B, and C during Frame FR where these functions execute the majority of the frame. As these functions are executing, several "sub" functions execute over time as well where the functions form clusters in the display. For example, in FIG. 4, during the execution of time period 1009, a cluster of "sub" functions K, U, GG, and LL execute. This could indicate to a viewer that functions A, B, and C are all calling/accessing "sub" functions K, U, GG, and LL during time period 1009 and that the "sub" functions may also possibly call each other during this time. As can be seen in FIG. 4, for example, the clusters also appear in descending order from left-to-right over time. Thus, the visualization once again shows the depth/breadth of program execution over a frame of display. The visualization could also be modified to show execution of the program over multiple frames of display so that the viewer can see the depth of program execution during each from over the multiple frames. These advantages are described in further detail below with respect to the examples shown in the drawings.

FIG. 1A is an example diagram showing illustrative functionality executed in a given period such as a frame of a program (e.g., such as a video game or game display program). Many software applications repeat execution of a main overall loop once for each frame of video production. This is especially true for video game simulations and other applications which repetitively generate images at periodic time intervals, but also is true for many other programs that are event or timer driven.

In its very simplest form, an illustrative main game routine is composed of two very generic loops: update game space and update audio/video processing. In most cases, a main game loop will likely consist of more elements including, but certainly not limited to, a game update function, a physics engine function, an input/output processing function, and/or a display/audio update function, as illustrated in FIG. 1A.

Figure 1B:
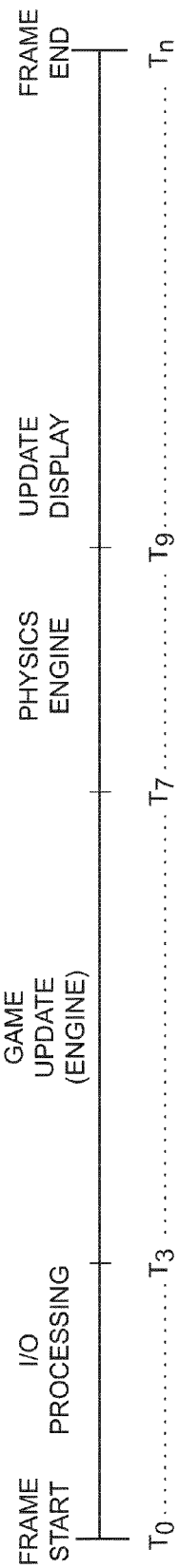
FIG. 1B is an example diagram showing an illustrative timeline for functionality being executed in a frame of a program.

FIG. 1B shows an example of a timeline of events for an example, non-limiting game loop during execution of one frame of the loop. In the example shown in FIG. 1B, the game loop has a "game engine" function, a "physics engine" function, an "input/output processing" function, and an "update display" function. It should be appreciated that each of these functions may access one or more sub-functions (i.e., child functions) which, in turn, could also have one or more sub-sub-functions.

In the example shown in FIG. 1B, frame execution occurs from time $T_0$-$T_n$ where the one or more functions in the main game loop are executed. For example, from time $T_0$ to $T_3$ the "input/output processing" function will execute, from $T_3$ to $T_7$ the "game engine" function will execute, from $T_7$ to $T_9$ the "physics engine" function will execute, and from $T_9$ to $T_n$ the "update display" function will execute. FIG. 1B thus shows a simplified example non-limiting timeline of a main game loop executing over one frame of a video game.

It should be appreciated that, especially in modern gaming, the main game loop will access several functions which in turn have multiple "child" functions. Thus, over one frame of execution, dozens to hundreds of functions may be called. It would be advantageous to provide a system that can, among other benefits, organize the various functions that are called in a manner that tells a story about the execution of the program during one or more frames.

With any computer program, a statistical sampling can be recorded with very little impact on performance. By periodically stopping the program many times a second, the current call stack can be recorded each time and then the program can be allowed to run again. Sometimes known as a sampling profile, this data set can be used to extract useful information about the running program, such as a list of functions that run most often, thus taking up most of the available CPU time.

The present technology aims to automatically curate a select list of functions and order them in such a way, along with their data, as to give insight into how the program executes inside an individual frame or other repeated task. This final sorted list of functions and associated graphs provides an abstract understanding of the program execution, thus simplifying the recorded execution of thousands of functions down to a select ordered few. The result tells a "story" of the execution within a frame of display, which can be easily understood, even by people who are unfamiliar with the code.

Figure 2:
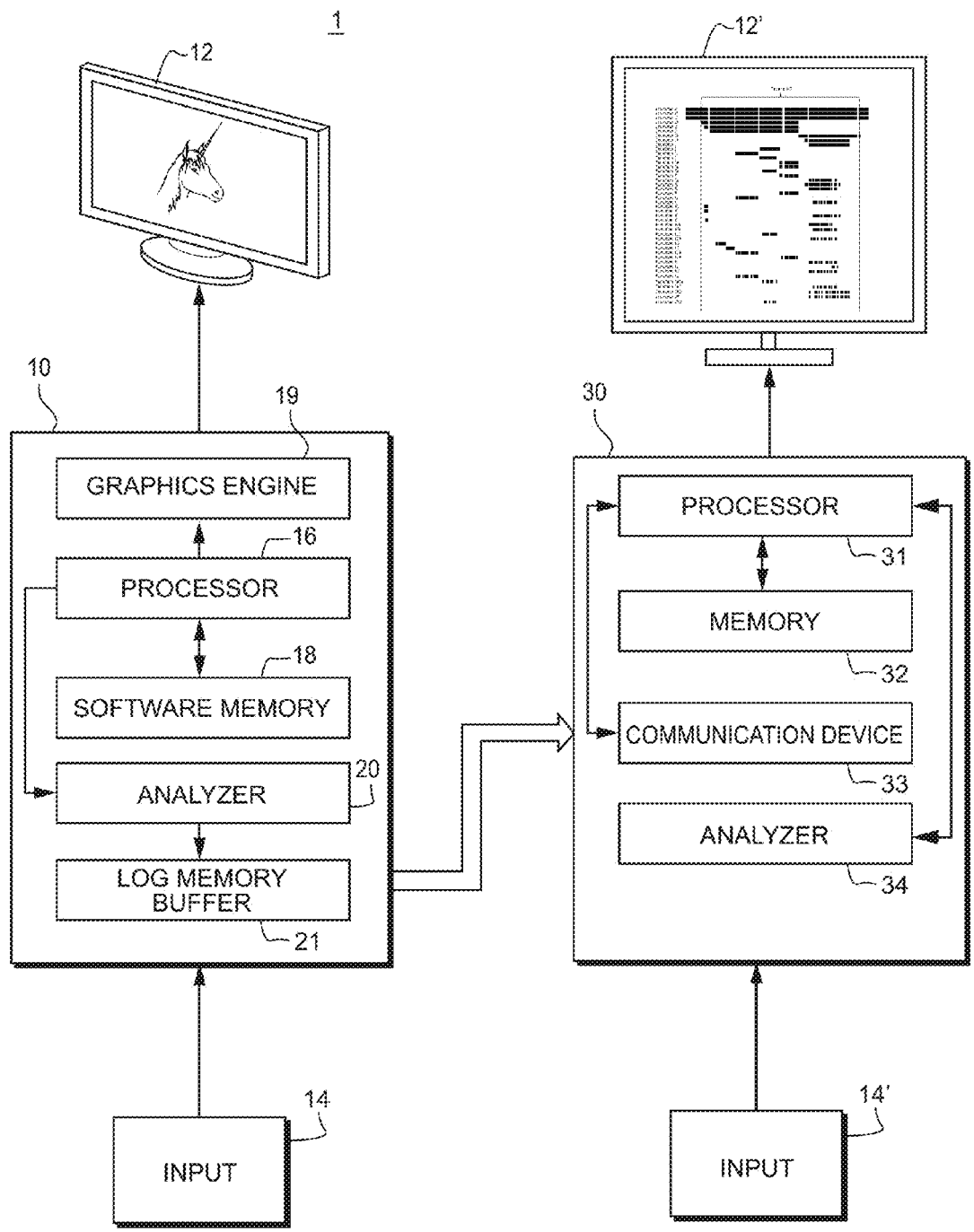
FIG. 2 is a block diagram showing an illustrative implementation of a software analysis system.

FIG. 2 is a block diagram showing an illustrative non-limiting implementation of a video game system 1, which can include, for example, an embedded computing device. System 1 runs functions such as the ones shown in FIG. 1 while also providing analysis. The system 1 includes a computing system 10 connected to a display 12 (or display device 12) and an input device 14. The computing system 10 includes a processor 16, which can execute a video game program of the type whose behavior is shown in FIG. 1A. The game program can be stored in a non-transitory game software memory 18. System 1 further includes a graphics engine 19 that generates graphics for display on the display 12. The system 1 is not limited to a single processor or memory, but can comprise multi-core architecture, multiple processors and/or multiple memories, and/or remotely accessed network (e.g., cloud) computing components. Input from input device 14 can affect/control program execution.

The graphics engine 19 includes a frame buffer memory that composes images periodically at a frame rate (e.g., every $\frac{1}{30}^{th}$ or $\frac{1}{60}^{th}$ of a second) and reads out the images for display on the display 12. Frame refresh rate may be controlled by a timer that interrupts the processor 16 periodically or non-periodically.

The computing system 10 can further include an analyzer 20 used in gathering the program execution data when the processor 16 executes a software program. The analyzer 20 can be implemented in any combination of software, hardware, and firmware. In one non-limiting illustrative embodiment, the analyzer 20 is a form of a software profiler that monitors a sequence of operations performed by the processor 16 while the processor executes the software program. The analyzer 20 non-intrusively samples the processor 16 program executions at various rates and timings. The analyzer 20 collects data, which may specify various functions that are called during the execution of the software program, and their addresses, which in turn indicate where in the memory program the instructions are stored, as well as counts of times particular functions are called. The analyzer 20 can store the collected data in a non-transitory log memory buffer 21.

The system 1 also includes a software analysis device 30 (or information processing apparatus 30) capable of communicating with the computing system 10 via a communications device 33, for example. The analyzer 20 of the system 10 collects analysis data that is stored in the log memory buffer 21 of the system 10 and this data can be conveyed to the software analysis device 30. The software analysis device 30 is also configured to have a processor 31 for processing data for analyzing the execution of a software program and a non-transitory memory 32 capable of storing a program for analyzing the execution of a software program. Likewise, the device 30 can be in communication with an input 14' and a display 12' (or display device 12').

The analysis device 30 is also configured to have an analyzer 34 that can analyze the dynamic program behavior of a software program based on the analysis data provided from the computing system 10. It should be appreciated that any of the components shown in system 30 could also be incorporated in system 10 as well as on a remote system (e.g., in the cloud).

Display 12 may output audio/video data from the program being executed on system 10, where display 12' can display a visualization of the analysis being performed by device 30. For example, a user can play a video game using system 10 where the game is displayed on display 12 while device 30 analyzes the gameplay and displays a visualization of a timeline display on display 12'. The technology is not limited to separately displaying these items and the same information can be conveyed on a single display or across a multitude of displays.

Example Non-Limiting Story Mode

The technology herein generates an abstract code execution timeline from repetitive programs, such as video games and simulations. This timeline may be referred to herein as "Story Mode," or "Story View," since it tells a story of how the program executes over the course of a frame. This abstract code execution timeline can then be used to facilitate program comprehension, such as for the purposes of modifying the code to improve execution speed, debugging, or other improvements.

FIGS. 3-7 show a non-limiting example of different views of example abstract code execution timelines that system 1 can produce. The views can be output on a display, such as display 12', for example, stored in non-transitory memory 32 for communications, or later use, etc.

Figure 3:
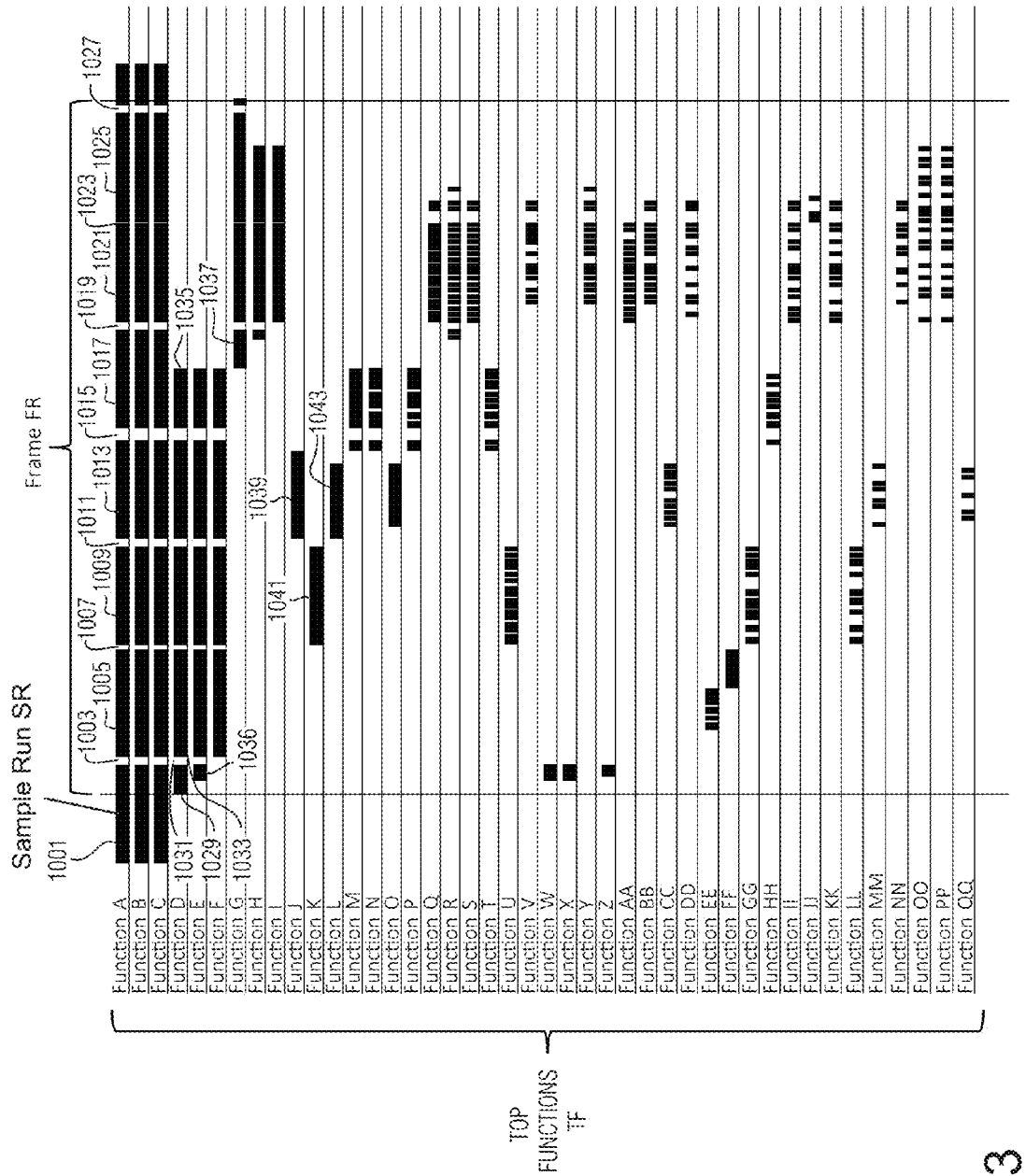
FIG. 3 depicts an illustrative example of a collection of functions from a profile.
Figure 4:
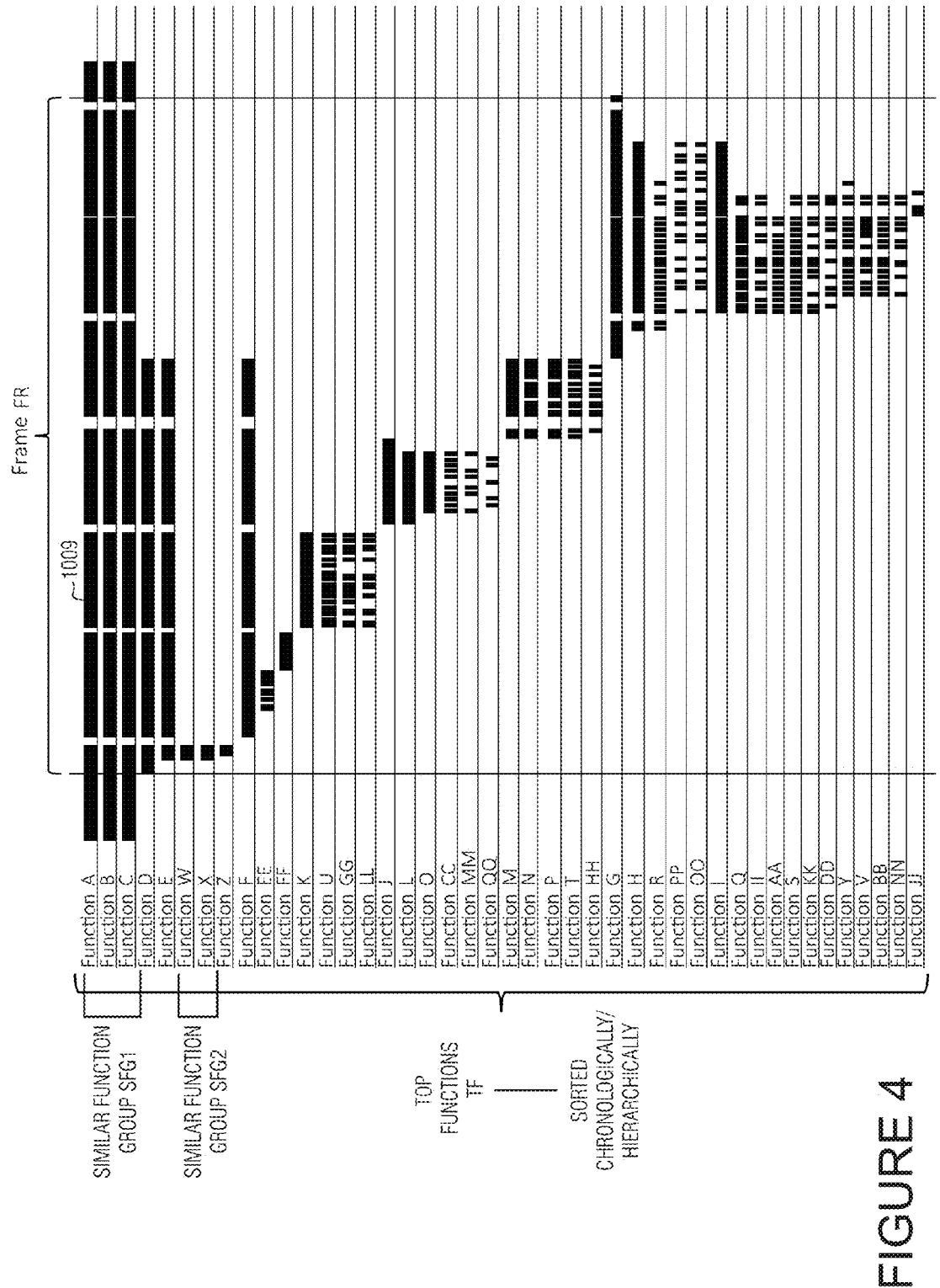
FIG. 4 depicts an example of a collection of functions from a profile that sorted chronologically and hierarchically.

The view in FIG. 3 shows the Top Functions TF executed during a Frame FR (e.g., the top n functions such as, for example, 43 functions from a profile out of several thousand sample functions), based on their number of inclusive samples recorded (highest at the top in this example). To the right of each function name are Samples Runs SR (or execution events) which are a graphical depiction of the sample runs that were recorded with respect to a given frame. For example, the "dark" bars indicate a Sample Run SR of execution history for the particular function where the "light" spaces in between the "dark" bars indicate that the function is not currently being processed/accessed. The timeline shown in FIG. 3 displays the graphical depiction for the top 43 functions A-QQ (of potentially out of 1000 or more functions executing during the Frame FR).

In the example shown, the timelines are ordered from top to bottom based on function activity—that is, the amount of time (e.g., number of samples) during which the particular function is active. For example, function A is the most active function depicted in FIG. 3.

Within example Frame FR, function A is executing during most of the frame with a few hiatus, non-execution intervals. For example, function A begins executing before the beginning of Frame FR during an execution period 1001, then ceases execution for a short time period 1003 before resuming execution during a subsequent execution period 1005. Similarly, function A ceases execution for an even shorter time period 1007 before resuming execution again during execution period 1009. This pattern continues to nearly the end of the frame through execution periods 1013, 1017, 1021, 1025 with corresponding hiatus or non-execution periods 1015, 1019, 1023, 1027 of varying lengths interleaved therebetween. It should be appreciated that the non-execution periods 1015, 1019, 1023, 1027 could be periods where the function is not executing (i.e., not be accessed/called) or periods where the function is being interrupted by, for example, input/output operation.

As one can note, function B has nearly or exactly the same execution pattern as function A. Similarly, function C as shown in FIG. 3 has nearly or exactly the same execution patterns as functions A and B. Thus, one can visually infer from the stacked timeline display or graph of FIG. 3 that functions A, B and C may be closely related, and all executed during most of the time of Frame FR.

Reading down the graph from the top, the first function that has a different execution pattern from the functions A, B and C is function D. Function D in this example appears to begin executing at the beginning of Frame FR during execution period 1029, executes for a short time, and then ceases execution for a short non-execution time 1031 before beginning execution again during execution period 1033. Note that in this particular example, the non-execution time 1031 of function D appears to line up in time coincidence with non-execution time 1003 of function A. Note further however that as one reads across the graph of FIG. 3 from left to right, function D appears to follow the same execution pattern as functions A-C for a while but then about two-thirds into the frame time, function D has a shorter execution period 1035 that begins with function A execution period 1017 but then ceases about halfway in the middle of execution time 1017. When function D ceases execution period 1035, it is not called again for the remainder of Frame FR.

One can also see reading further down from the top of the FIG. 3 graph that functions E and F have a similar execution pattern to function D with some difference. For example, function E has a very short execution period 1036 as opposed to a longer execution period 1029 of function D, and function E has no such corresponding execution period at all.

Reading further down the FIG. 3 graph, function G appears to begin execution during execution period 1037 that begins after functions D, E and F cease execution. Function G continues to execute for most of the remainder of the frame with three gaps between having different non-execution periods. Functions H and I bear some similarity to function G but are not identical in that they execute for shorter periods even though they have at least one execution period that appears to be in common with function G.

Reading further down the FIG. 3 graph from the top, function J has a single execution period 1039 that occurs at approximately the center of Frame FR. It is called only once and is not called again. Similarly, function K has a single execution period 1041 that begins about one-quarter of the time into Frame FR and appears to cease just before function J begins executing. Function L has a single execution time 1043 that is shorter than the execution times of either function K or function J (this is why this particular graph function L is ordered below functions J and K) which appears to start at about the same time as function J's execution time 1039 but ends slightly earlier. Similarly, one can see unique execution patterns for functions M and N and so on.

Looking at FIG. 3, the eye can see that there is some time correlation between the execution times of these various functions. Listing them in the order shown and lining them up by coinciding their execution times in this way allows a skilled person to discern certain patterns and concurrency. However, the ordering of the processes in this example can obfuscate some important information. For example, the order in which functions A-C are presented draws the eye to the top three lines but there is very little additional information conveyed by the separate timelines of functions B and C since their execution times appear to be identical to the execution time of function A. Additionally, note that the order presented by the FIG. 3 graph (where the particular function timeline appears in a sequence determined by the percentage of execution time for example) leads to some confusion. For example, function G only executes near the end of the Frame FR, whereas function W executes right at the beginning of the frame. However, in the FIG. 3 graph, the eye reading the graph from top to bottom will see function G before function W even though function W executed long before function G during Frame FR.

FIG. 4 shows the same Top Functions TF (i.e., functions A-QQ), but reordered chronologically and hierarchically to show a reordered timeline view of the execution of the various functions. Thus, a user will be able to more easily understand the execution of a program during a particular frame by visualizing which functions are executed at what time and for how often during the Frame FR.

In the example shown in FIG. 4, the Top Functions TF show a certain organization as to which function sample runs are executed during the Frame FR. For example, functions A-C have sample runs spanning the entire Frame FR where the remaining functions D-JJ have samples for only a portion of the Frame FR. Also, the visualization displays the execution/sample runs for functions D-JJ descending from top to bottom as the samples execute and display from left to right.

It should be appreciated that during the execution of a program, certain functions may execute in parallel with other functions. This is especially true in modern day multi-core processing. Likewise, certain functions may call substantially related "child" functions to other functions. In the example shown in FIG. 4, functions A-C shown in Similar Function Group SFG1 call related "child" functions where functions W and X in Similar Function Group SFG2 call related "child" functions.

Compared to FIG. 3, the illustrative example FIG. 4 graphical presentation has reordered all of the functions based upon when they first execute during the Frame FR. Hence because functions A-C are executing at the very beginning of the Frame FR, they appear first on the top three timelines of the graphical presentation. Similarly, functions D and E appear in the same position that they were shown in FIG. 3 because they also execute at or near the beginning of Frame FR. However, in the FIG. 4 example shown, functions W, X and Z appear next reading from top to bottom because they also execute near the beginning of Frame FR and before, for example, function F. In the FIG. 4 example shown, function F appears next because it begins executing soon after functions W, X and Z begin executing, and then the next function that appears is function EE because it begins executing next. One can see that the FIG. 4 example graphical presentations can be more comprehensible in telling a story than the one shown in FIG. 3. In particular, one can see that functions W, X and Z begin executing early in the frame, followed by function F, function EE, function FF, and then functions K, U, GG and LL all execute next and so on.

In the example shown in FIG. 4, certain functions executing within a same time period are ordered based on varying levels of prioritization. For example, function C has an earlier left-most starting time compared to function D so function C should be ordered above function D. That is, even though functions C and D have a same right-most "ending" time, function C is listed higher due to its earlier "start" time. Likewise, nearing the end of execution for function D, functions C and D start at a same time (e.g., during frame 1035 shown in FIG. 3) but as function C has a farther right-most ending time, function C would still be shown higher in order than function D. Thus, as one "tie-breaking" condition, the system will determine which function should list higher based on its left-most start time or right-most end time. Should the functions have nearly the same execution during a sampling period (e.g., functions A-C shown in FIG. 4), the system can look to the program call stack to determine which functions actually execute more than others during that time.

Although FIG. 4 can be more useful and comprehensible than FIG. 3, there is still a fair amount of redundancy. In particular, for example, functions A, B and C tell essentially the same story and yet they are all presented in a way that adds to the overall complexity of the presentation. This is a bit like telling a story of three friends who go on a walk together by first explaining what friend A did, then explaining in the same detail what friend B did and finally explaining in the very same detail what friend C did. Once you know the story of what friend A did, you pretty much know what friends B and C did since all three were walking together. While this may be very useful for some uses, it may be desirable to simplify the story as much as possible in order to convey the big picture to the user.

Figure 5:
FIG. 5 illustrates an example of a collection of functions from a profile that exclude similar children.

FIG. 5 thus shows a "pruned" set of functions from FIG. 4 where similar children are excluded. That is, the functions shown in FIG. 5 are representative of function calls during Frame FR where several functions from functions A-QQ are excluded by virtue of having similar children accessed by the functions.

For example, functions B and C from Similar Function Group SFG1 are omitted where only function A is displayed. Likewise, function X in Similar Function Group SFG2 is omitted where function W is displayed. Pruning the set of functions in this manner is advantageous because it aids in the understanding of the overall processing of the program during Frame FR without showing functions that duplicate function calls and processes of other functions (i.e., to eliminate redundant functions).

FIG. 5 also shows the listing of functions visualized in a manner such that the functions are ordered from top to bottom based on chronological execution, where the functions executing more frequently are displayed higher in the order. As described above, FIG. 5 can be more useful and comprehensible than FIG. 4 in that functions having similar children with regard to execution are omitted thus eliminating "redundant" functions from the visualization. Thus, FIG. 5 shows the process of execution over the Frame FR where the duration of execution for each function is shown from left to right along an axis of the display where the chronological execution of the function with respect to the other functions in the visualization is ordered from top to bottom.

Figure 6:
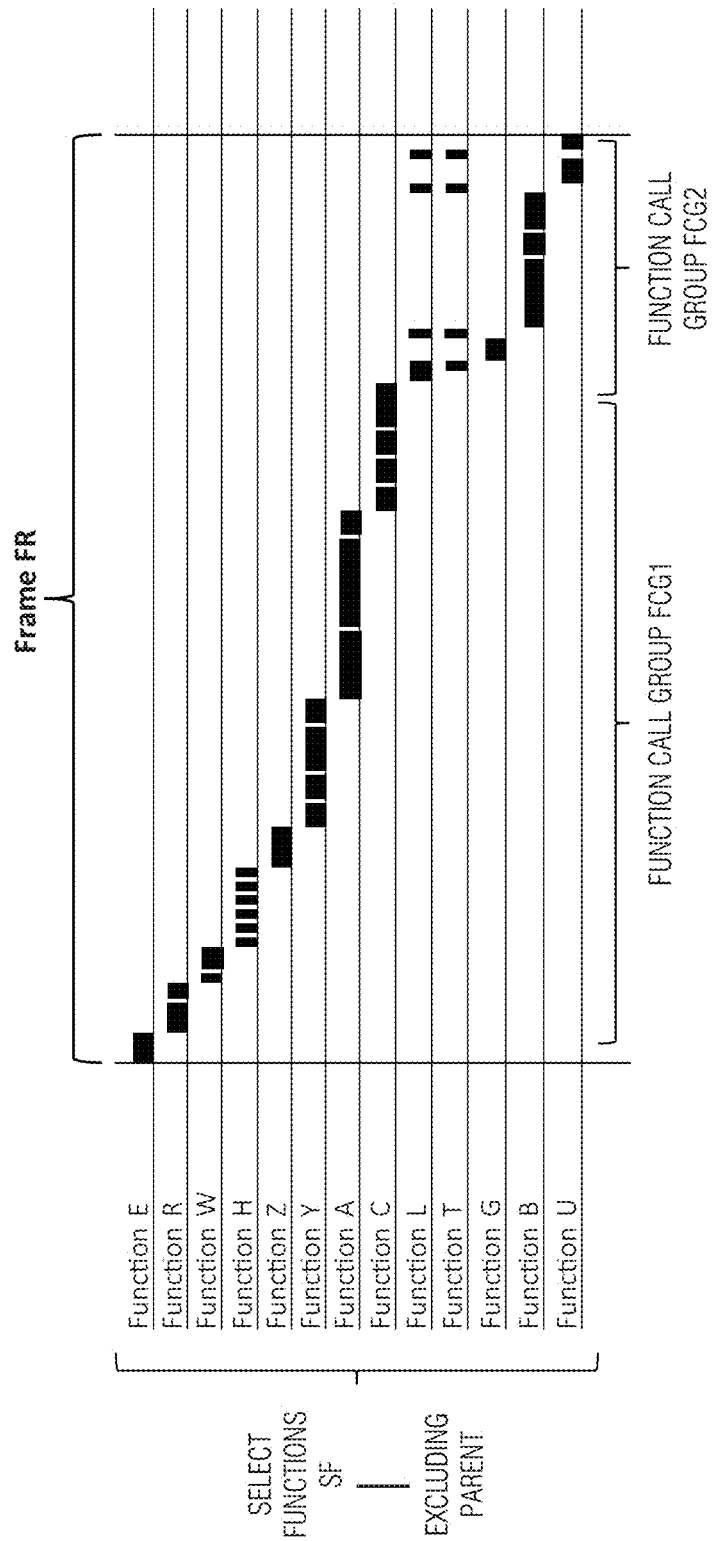
FIG. 6 depicts an example of a collection of functions with an include parent option disabled.
Figure 7:
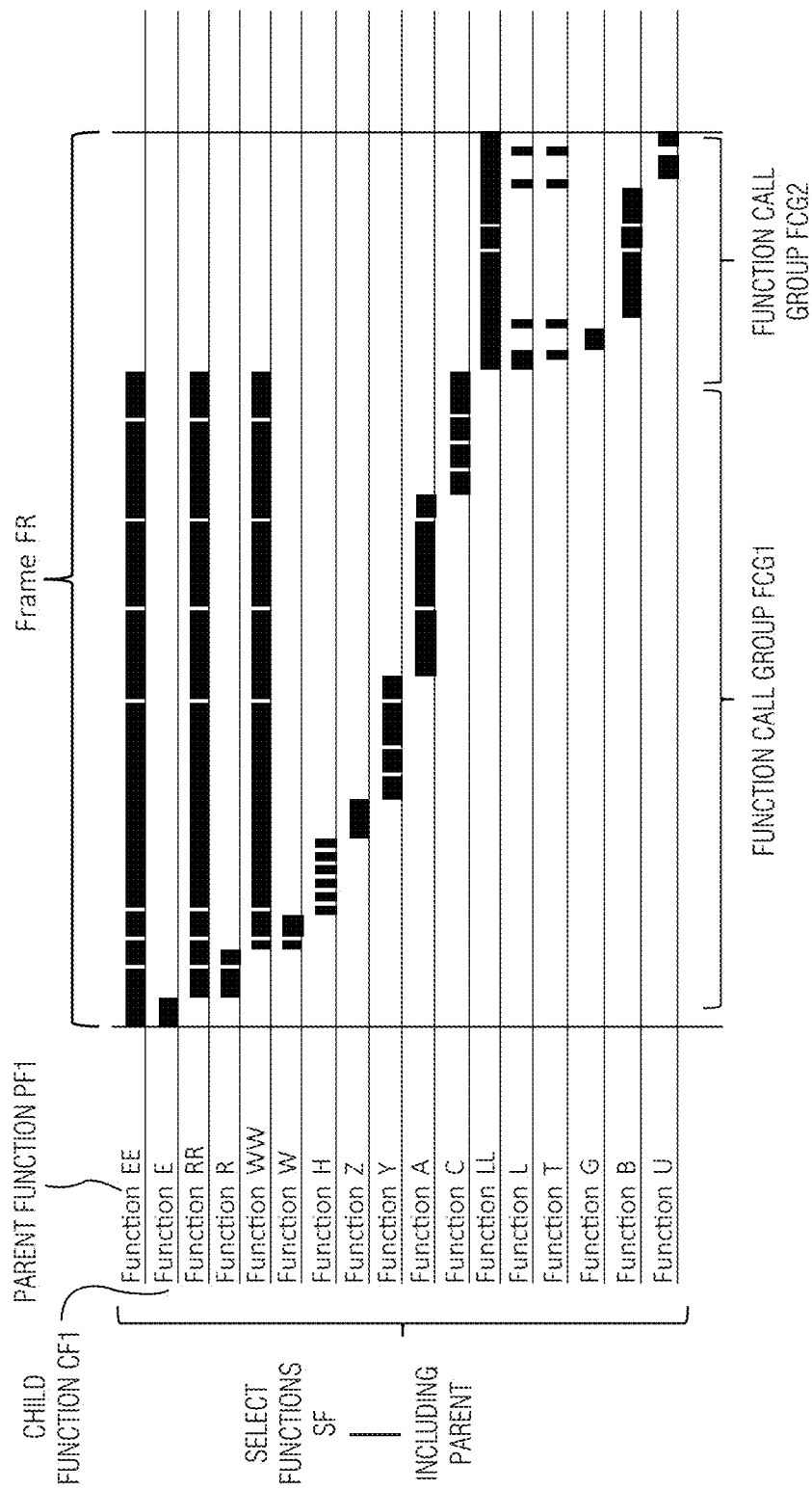
FIG. 7 depicts an example of a collection of functions with an include parent option enabled.

FIGS. 6 and 7 show a select group of functions. FIG. 6 shows a set of functions selected and sorted with an "include parent" option disabled where FIG. 7 shows a set of functions selected and sorted with the "include parent" function enabled.

In FIG. 6, Select Functions SF are displayed showing the sample runs from left to right and the functions that are called during the Frame FR over time from top to bottom. As will be explained in further detail below, the functions in this example are called over two general groups. For example, functions E-C from Select Functions SF are called/sampled within Function Call Group FCG1 where functions L-U from Select Functions SF are called/sampled within Function Call Group FCG2.

As a non-limiting example, FIG. 6 could show the execution process of a set of functions over time during a Frame FR of execution thereby visualizing how the function is called over time. For example, the program during Frame FR may first call function E for a period of time in which function R is called next. The program would continue by calling functions R-U where certain functions may be called more than once during the frame (e.g., functions A, C, L).

As also explained above, the various gaps in function execution could represent that the function is being called several times during that particular frame. The gaps can also represent the function being interrupted. For example, function H, as shown in FIG. 6, is being called once during the Frame FR, but being interrupted several times (e.g., by input/output interrupts). Thus, the visualization can also depict to a viewer that the execution of function H is being interrupted for some reason during its execution for this frame.

FIG. 6 can show the execution of a program over a given Frame FR where the duration of each function is displayed from left to right and the functions are ordered from top to bottom chronologically (i.e., by when they are called during execution of this frame). In FIG. 6, the visualization shows a more condensed story of program execution. The level of detail could be user customized and the user can see more select functions or less select functions depending upon the desired level of detail. For example, a user could variably select the number of functions that are to be displayed (e.g., functions 1-n) or the story mode could be pre-set. As an example, the system could have a "brief story" option where approximately 10 functions are listed thereby condensing the story of function execution during frame FR. Likewise, the system could show a "full story" option where more functions are listed giving more detail (e.g., 20 functions).

The system could go into even more detail and provide a "fine story" option giving effectively drilling down farther into the function execution (e.g., 40-50 functions). The functions shown in FIGS. 6 and 7 are selected based upon certain threshold percentages that could also be user defined and these threshold values are discussed further below with respect to FIG. 12.

FIG. 7 thus shows the Select Functions SF executed over Frame FR from FIG. 6, but also including the parent functions. For example, function EE is representative of Parent Function PF1 for function E as Child Function CF1.

In the example shown in FIG. 7, the Function Call Groups FCG1 and FCG2 convey to a user that three parent functions (functions EE, RR, WW) are called during the first grouping of functions where a single parent function (function LL) is called during the second grouping of functions. Thus, functions E, R, W, H, Z, Y, A, and C are called during the first grouping by a combination of functions EE, RR, WW where functions L, T, A, B, and U are called during the second grouping by function LL. It should be appreciated that the function parents shown in FIG. 7 will have a more generic name in the actual visualization where the child functions will have a more descriptive name.

Similar to FIG. 6, FIG. 7 could show the execution process of a set of functions over time during a Frame FR of execution thereby visualizing how the function is called over time. FIG. 7 though includes parent functions EE, RR, WW which could show how child functions E-U are called during execution of the program during Frame FR. For example, function EE could be a parent function to several child functions where the first child function called by function EE is function E. As the program executes over the frame, parent functions could call several child functions. In the example shown in FIG. 7, functions EE, RR, and WW substantially run during the first grouping of functions and several child functions (i.e., functions E, R, W, H, Z, Y, A, and C) are called during that time. Likewise, function LL substantially runs during the second grouping of functions and several child functions (i.e., functions L, T, A, B, and U) are called during that time.

It should be appreciated that, although FIGS. 3-7 show the visualization of functions in black and white, the functions could be color coded for easier understanding of function execution. For example, a color palette of 16 colors could be used to color code functions A-QQ in FIG. 3 where function A could have color blue, function B could have color red, function C could have color yellow, and so on.

Figure 8:
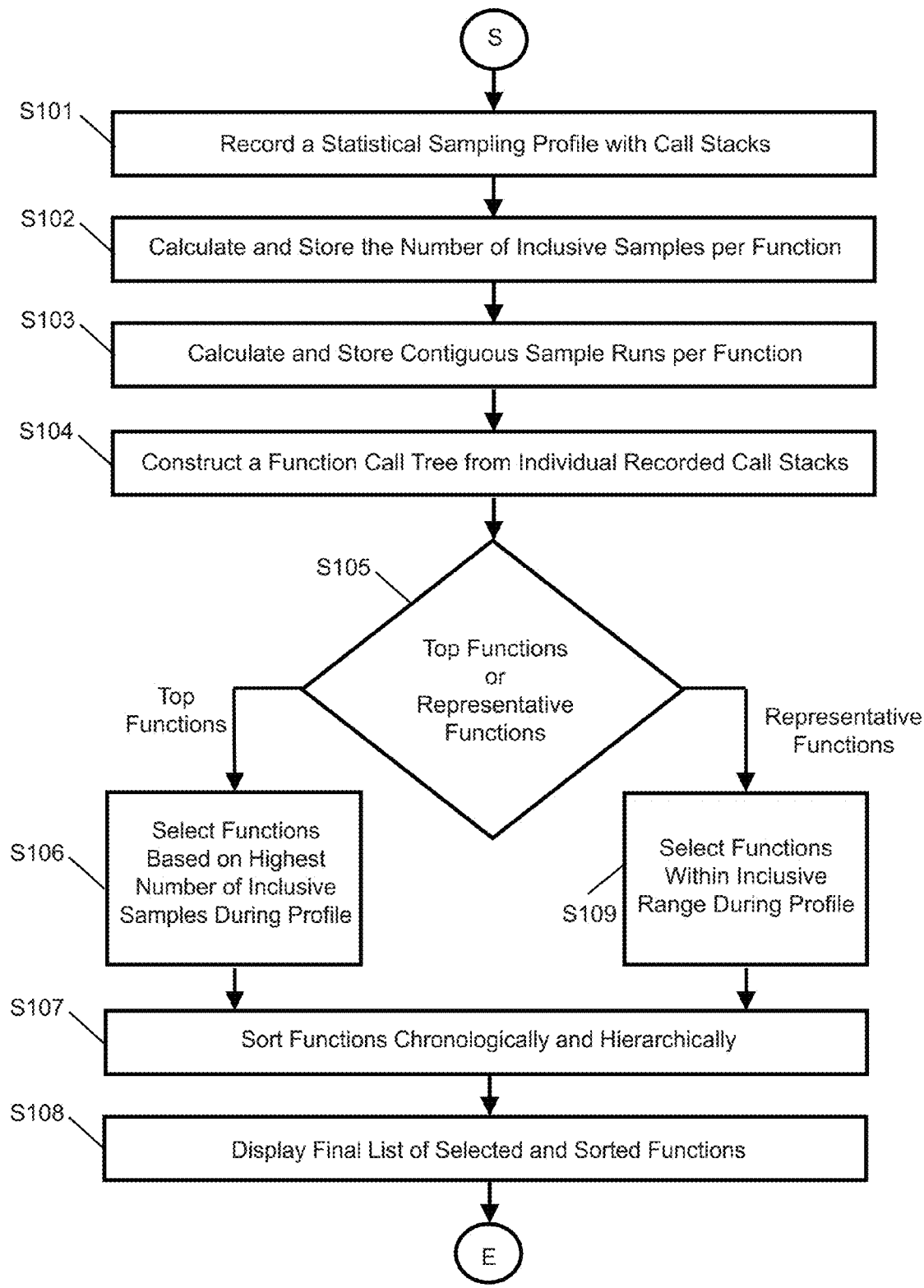
FIG. 8 is an example embodiment of a flowchart depicting the overall software analysis implemented via the present technology.

FIG. 8 shows a non-limiting example flowchart depicting overall processes for generating a code execution timeline. The system 1 begins by recording a statistical sampling profile with function call stacks (S101). For example, analyzer 20 can periodically stop the running program (e.g., 50,000 times per second) and the current call stack can be recorded in buffer 21.

With the recorded statistical sampling profile, the system 1 can calculate and store the number of inclusive samples per function (S102). As a non-limiting example, the number of inclusive samples per function could be a number of recorded call stack samples that contain the function.

The system 1 can also use the recorded statistical sampling profile to calculate and store contiguous sample runs per function (S103). The new data can be stored per function and contain a list of runs, noting a start time and an end time for each run.

The system 1 can further use the recorded statistical sampling profile to construct a function call tree (S104). The tree, in a non-limiting example implementation, can be a connected graph of nodes, with each node representing a function. In creating the tree, the system 1 can take each recorded call stack sample and combine the information to generate the call tree. For each node in the call tree, the number of times it appeared in a recorded call stack can be stored, for example, in memory 32. This is sometimes referred to as a number of "inclusive" samples because it represents a sample where execution stopped inside that function or within a function it called.

Upon constructing the function call tree, the system 1 can determine if the abstract should be created using top functions or representative functions (S105). The option can be set, for example, by a user via a user interface. If the top functions option is selected the system 1 can select functions based on a highest number of inclusive samples recorded during the profile (S106). If the representative functions option was selected, the system 1 can select the functions that are based on the range of inclusive samples recorded during the profile (S109). Regardless of the option, the system 1 will sort the functions chronologically and hierarchically (S107) and then display a final set of selected sorted functions (S108).

Figure 9:
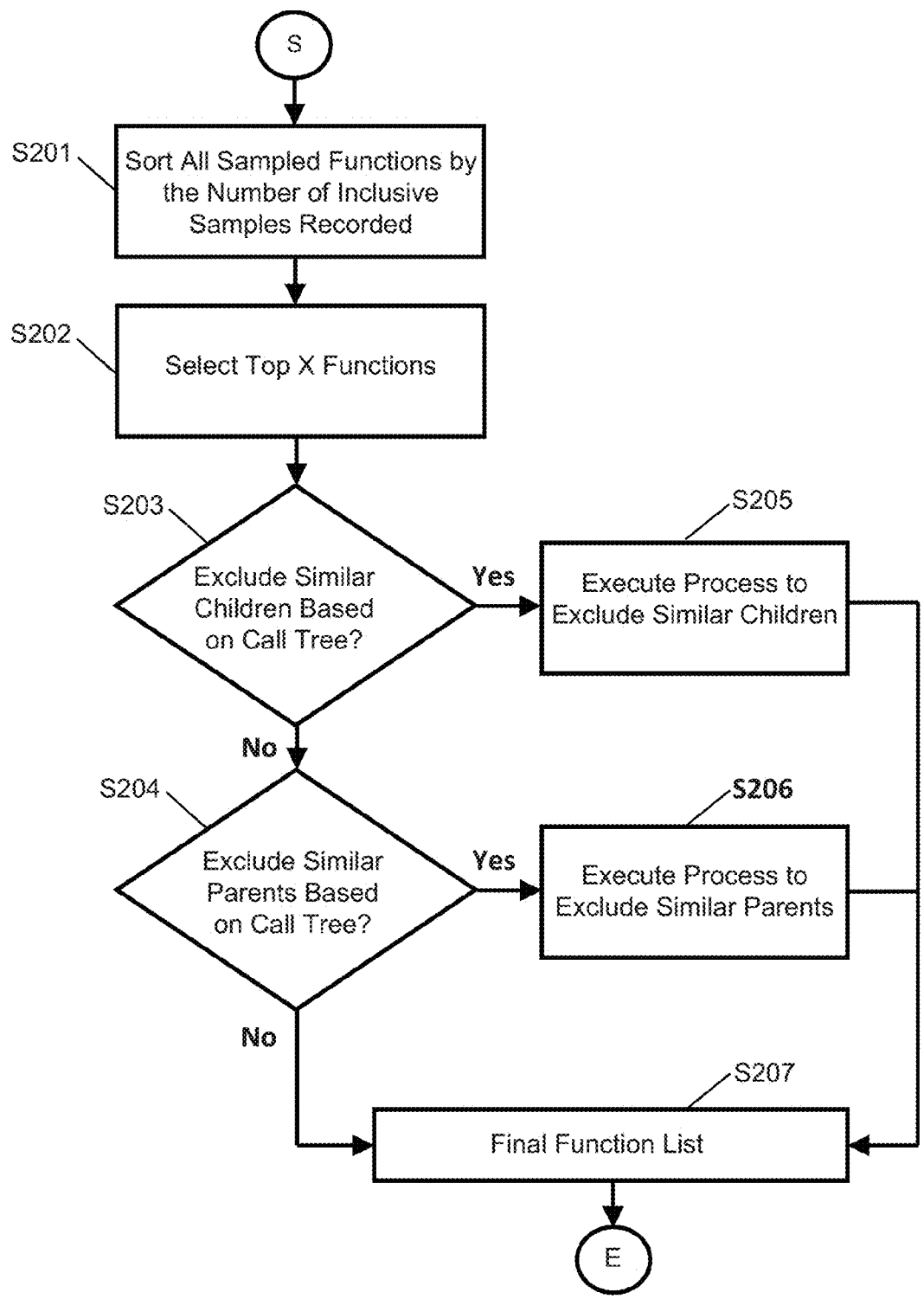
FIG. 9 is an example embodiment of a flowchart showing a selection of functions based on a highest number of inclusive samples during profiling.

FIG. 9 shows a non-limiting example of a flow of processes for selecting functions based on a highest number of inclusive samples during profiling. The system 1 begins by sorting all of the sampled functions by the number of inclusive samples during the profile (S201). The system 1 then selects the top functions having the highest number of inclusive samples (S202) where the exact number of functions may be configurable (e.g., by a user). For example, the system 1 could be configured to show the top 50 functions having the highest number of inclusive samples.

Upon selecting the top functions, the system 1 determines whether it should exclude similar function children based on the call tree (S203) and proceeds to exclude similar children if so (S205). The details regarding the exclusion of similar children are discussed below.

If the system 1 determines that it will not exclude similar children, the system 1 then determines if similar parents based on the call tree should be excluded (S204). If the system 1 determines that similar parents should be excluded, the system 1 then executes a process for excluding similar parents (S206) which is discussed further below. Upon determining if either (or both) the similar children and similar parents should be excluded, the system 1 will create the final function list (S207).

Figure 10:
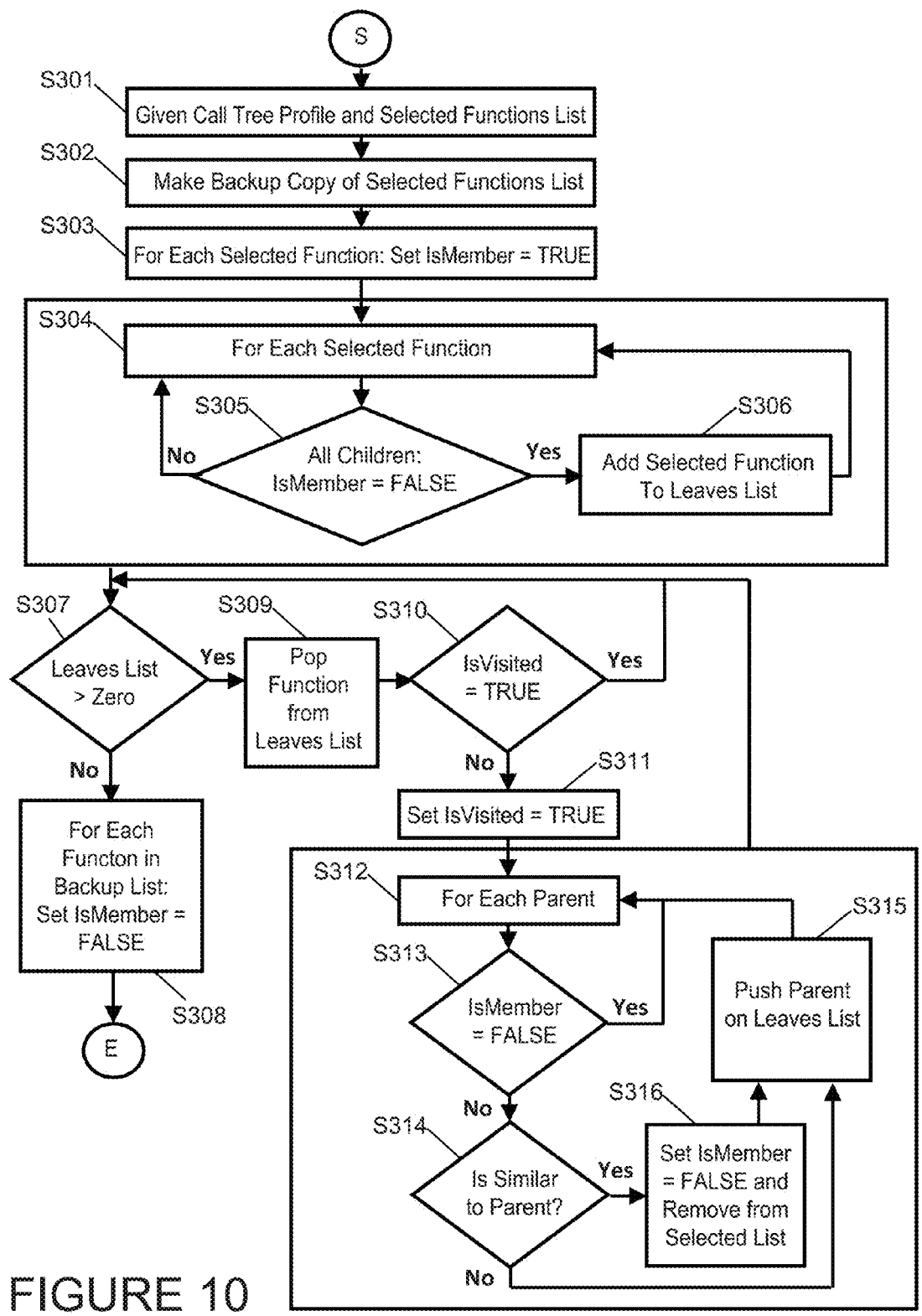
FIG. 10 is an example embodiment of a flowchart showing processes for excluding similar children during tree traversal.

FIG. 10 shows a non-limiting example embodiment of a flowchart showing processes for excluding similar children during tree traversal. The system 1 begins by establishing a call tree and a selected functions list (S301) where a backup copy of the selected function list is made (S302).

An IsMember variable can be set for each selected function in the functions list, where the initial value of IsMember is set to TRUE (S303). The IsMember variable is useful in helping identify which functions in the call tree are members of the selected functions list which expedites processing.

The system 1 can, for each selected function (S304), reference the call tree and verify that all of the function's children are not members of the selected function list by checking the function's "IsMember" variable (S305). If, for the selected function, all children are not members, the system 1 will add the selected function to a "leaves list" (S306) which will be used to traverse the tree. The system 1 will continue to traverse through the selected functions repeating this process (S304).

When all of the functions have been analyzed (S304), the system 1 will determine if the "leaves list" is not empty (i.e., having a number in the list greater than 0) (S307). If the "leaves list" is empty (or if the "leaves list" has no more functions to analyze), then the IsMember variable for each function in the backup list is set to FALSE in order to reset the bookkeeping for later analysis (S308). If the "leaves list" is not empty, the system 1 will then pop functions from the "leaves list" (S309). If the popped function's "IsVisited" variable is set to TRUE, the system 1 will return to see if the "leaves list" is now empty (S307). If the "IsVisited" variable is set to FALSE, the function's "IsVisited" variable is set to TRUE (S311) and the function is analyzed.

More specifically, the system 1 determines, for each parent of the function based on the call tree (S312), if the "IsMember" variable for the parent is set to FALSE (S313). If the variable is set to FALSE, the system 1 moves on to the next function's parent (S312). If the variable is set to TRUE, the system 1 determines if the parent function is similar to the child function (S314). In a non-limiting example implementation, two functions can be similar if the number of inclusive samples is within a threshold of each other (e.g., 50% or 99% similar). The similarity threshold could optionally be set by a user. If they are similar, then the parent function and the child function are both members of the selected function list and thus it can be desirable to keep the parent function and eliminate the child function. The system 1 will thus set the child function's "IsMember" variable to FALSE (S316) and the child function will be removed from the selected function list. In either case, the system 1 will push the parent function on to the "leaves list" and continue the process for each parent (S312). Once all of the parents have been considered, the system 1 returns back to determine if the "leaves list" is now empty (S307) where the processes may be repeated if the list is still not empty.

Figure 11:
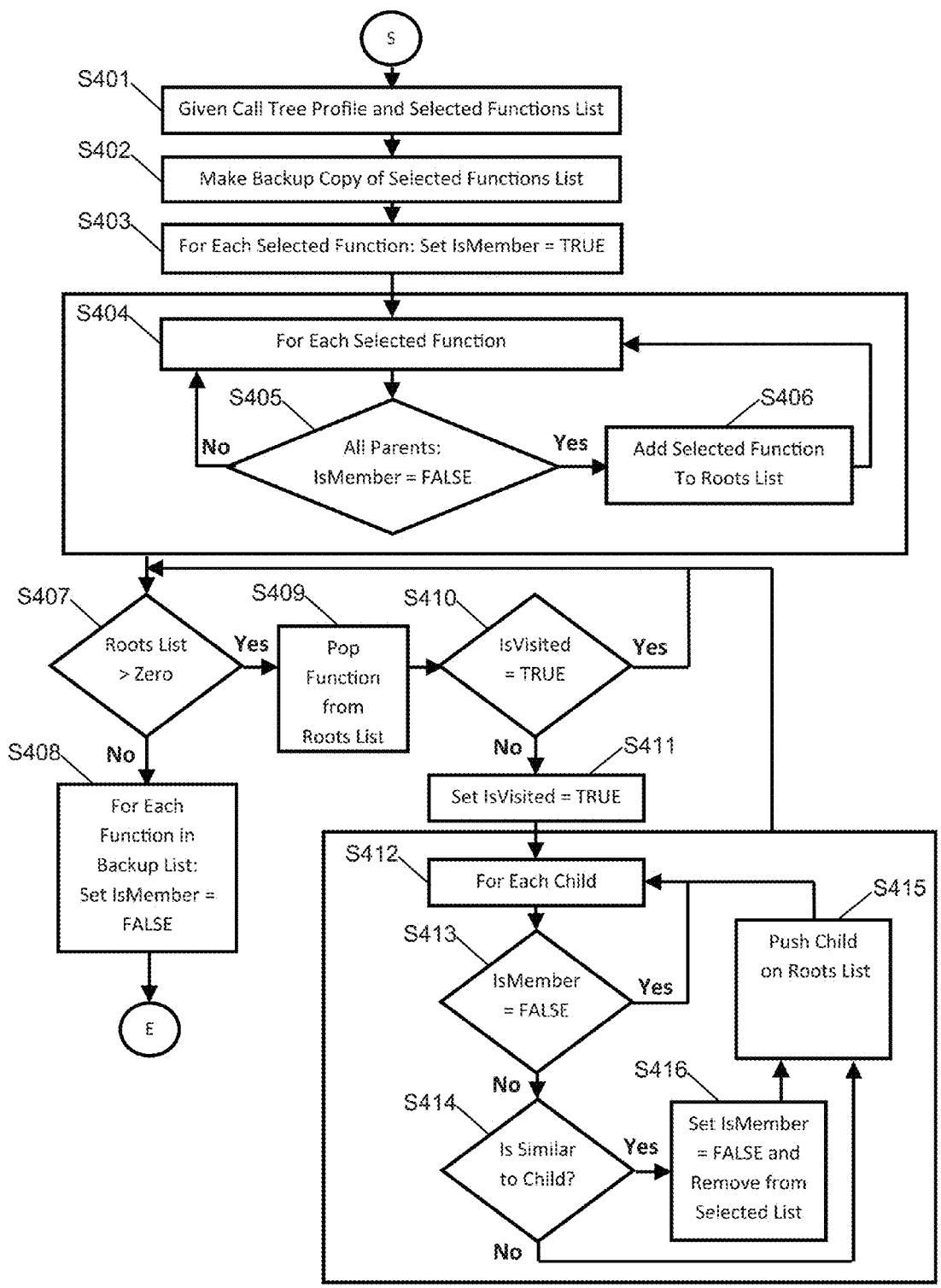
FIG. 11 is an example embodiment of a flowchart showing processes for excluding similar parents during tree traversal.

FIG. 11 shows a non-limiting example embodiment of a flowchart showing processes for excluding similar parents during tree traversal. The system 1 begins by establishing a call tree and a selected functions list (S401) where a backup copy of the selected function list is made (S402).

As described above, an "IsMember" variable can be set for each selected function in the functions list, where the initial value of "IsMember" is set to TRUE (S403). The IsMember variable is useful in helping identify which functions in the call tree are members of the selected functions list which expedites processing.

The system 1 can, for each selected function (S404), reference the call tree and verify that all of the function's parents are not members of the selected function list by checking the function's "IsMember" variable (S405). If, for the selected function, all parents are not members, the system 1 will add the selected function to a "roots list" (S406) which will be used to traverse the tree. The system 1 will continue to traverse through the selected functions repeating this process (S404).

When all of the functions have been analyzed (S404), the system 1 will determine if the "roots list" is not empty (i.e., having a number in the list greater than 0) (S407). If the "roots list" is empty (or if the "roots list" has no more functions to analyze), then the IsMember variable for each function in the backup list is set to FALSE in order to reset the bookkeeping for later analysis (S408). If the "roots list" is not empty, the system 1 will then pop functions from the "roots list" (S409). If the popped function's "IsVisited" variable is set to TRUE, the system 1 will return to see if the "roots list" is now empty (S407). If the "IsVisited" variable is set to FALSE, the function's "IsVisited" variable is set to TRUE (S411) and the function is analyzed.

More specifically, the system 1 determines, for each child of the function based on the call tree (S412), if the "IsMember" variable for the child is set to FALSE (S413). If the variable is set to FALSE, the system 1 moves on to the next function's child (S412). If the variable is set to TRUE, the system 1 determines if the child function is similar to the parent function (S414). In a non-limiting example implementation, two functions can be similar if the number of inclusive samples is within a threshold of each other (e.g., 50% or 99% similar). The similarity threshold could optionally be set by a user. If they are similar, then the child function and the parent function are both members of the selected function list and thus it can be desirable to keep the child function and eliminate the parent function. The system 1 will thus set the parent function's "IsMember" variable to FALSE (S416) and the parent function will be removed from the selected function list. In either case, the system 1 will push the child function on to the "roots list" and continue the process for each child (S412). Once all of the children have been considered, the system 1 returns back to determine if the "roots list" is now empty (S407) where the processes may be repeated if the list is still not empty.

Figure 12:
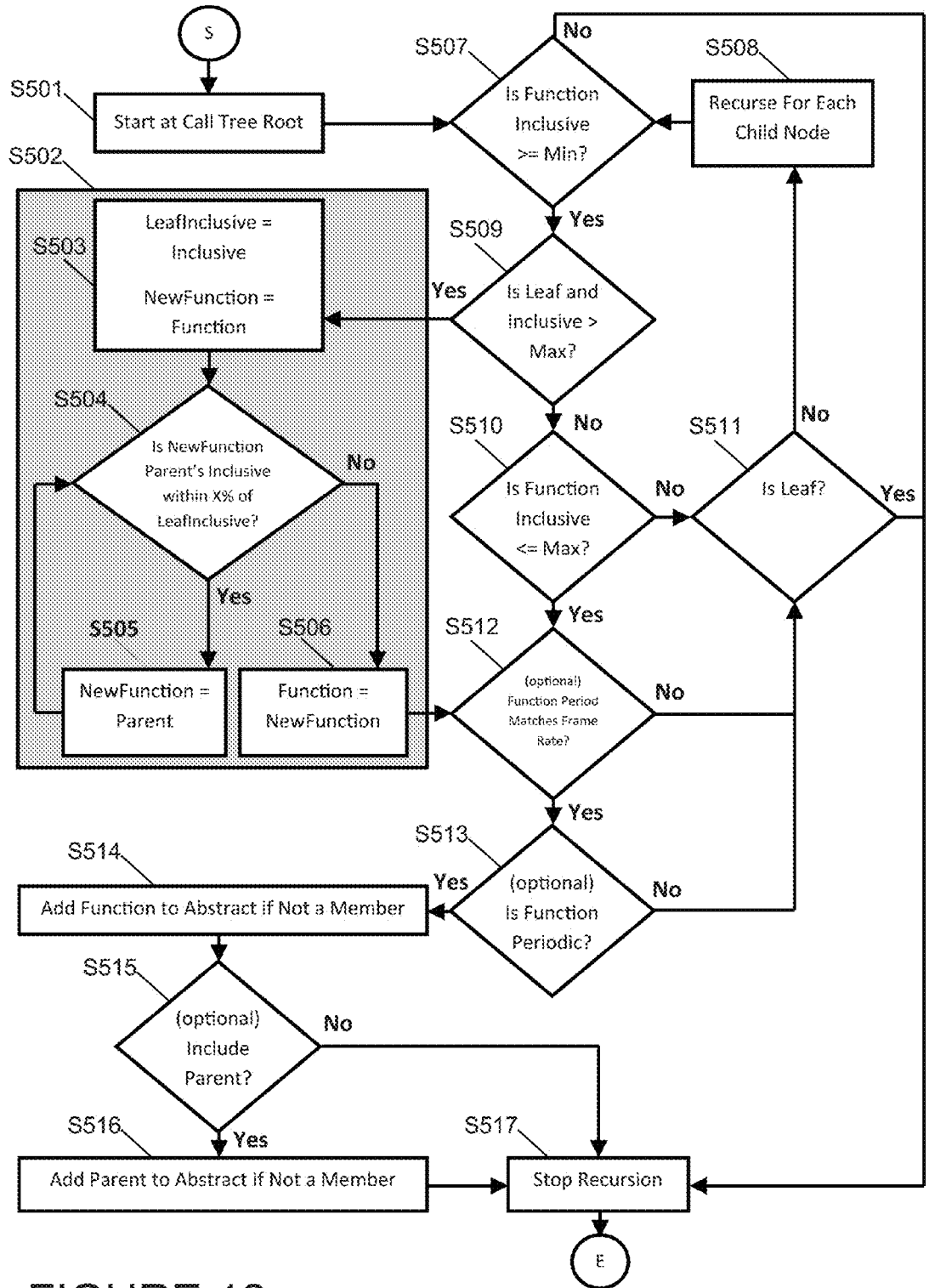
FIG. 12 is an example embodiment of a flowchart depicting a selection of functions within an inclusive range during profiling.

FIG. 12 illustrates a non-limiting example embodiment of a flowchart depicting a selection of functions within an inclusive range during profiling. The system 1 begins by traversing the call tree functions starting at the root (S501) and determines if the traversed function's inclusive percentage is greater than or equal to a minimum value (S507). As a non-limiting example, the inclusive percentage could be the function's inclusive sample count divided by the number of samples recorded where the minimum value could optionally be user defined (e.g., 1% or 0.1%). If the function's inclusive percentage is less than the minimum value, the recursion will cease (S517). If the percentage is greater than or equal to the minimum value, the system 1 determines if the function is a leaf node in the call tree and if it's inclusive percentage is greater than a maximum value (S509). If the inclusive percentage is greater than a maximum value, the system 1 defines a process to traverse the call tree from the leaf function to find the most representative function that is similar to the leaf function within some threshold percentage (S502). If the inclusive percentage is less than or equal to the maximum (S510) value, the system 1 can perform an optional step of determining if the function period matches the frame rate (S512). If the function period matches the frame rate, the system 1 can optionally determine if the function is periodic (S513).

If the function is determined that it should not be included in the abstract (S511), the system 1 determines if the function is a leaf node where recursion will cease (S517) and if it is not a leaf node, the system 1 will continue recursion for each of the function's child nodes (S508) meaning that each child function should spawn off for further processing (S507).

In defining the process to traverse the call tree from the leaf function (S502), the system 1 assigns the variable "LeafInclusive" with the function's inclusive percentage and assigns the variable "NewFunction" with the current function (S503). If the "NewFunction" parent's inclusive percentage is within a variable percentage of "LeafInclusive" (where the variable percentage can be user defined, for example, 5%) (S504), the system 1 traverses up the call tree by assigning the variable "NewFunction" with "NewFunction" parent function (S505) and repeats the determination if "NewFunction" parent's inclusive percentage is within a variable percentage of "LeafInclusive" (S504). If the "NewFunction" parent's inclusive percentage is not within a variable percentage of "LeafInclusive" (S504), the system 1 assigns "Function" with the function held in "NewFunction."

The system 1 can then add the function to the abstract if it is not already a member of the abstract (S514) and then continue to optionally determine if the parent should be included (S515). If the parent function should be included, the parent function will be added to the abstract if it is not already a member of the abstract (S516) where recursion will then cease (S517).

Figure 13:
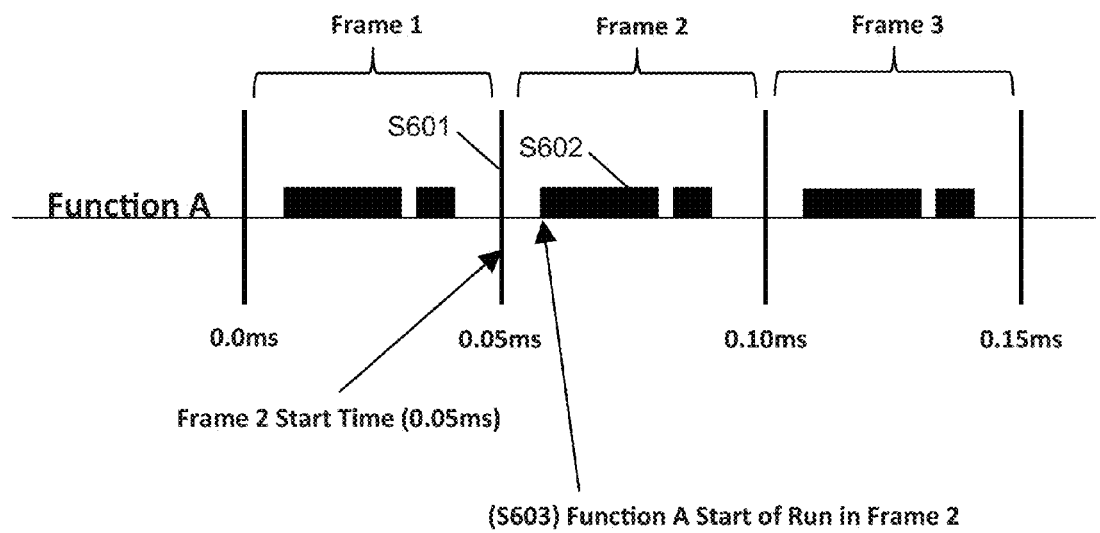
FIG. 13 depicts an example of a function with multiple sample runs across multiple frames.
Figure 14:
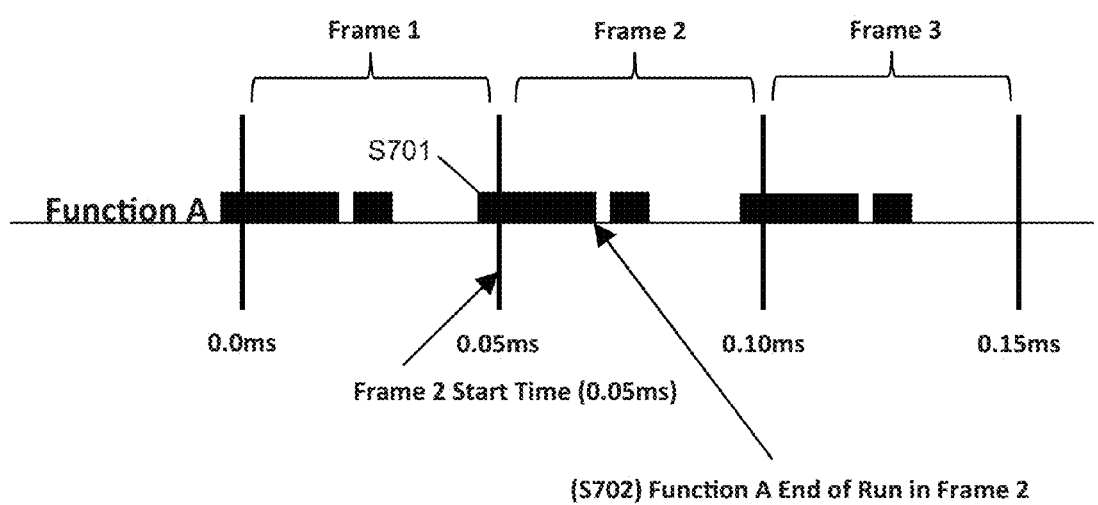
FIG. 14 depicts an example of a function with multiple sample runs across multiple frames.

FIGS. 13 and 14 show a non-limiting example of functions with multiple sample runs across multiple frames. FIG. 13 shows an example of a start of a run in frame 2 where a frame start time (S601) is shown at 0.05 ms where the sample run (S602) is shown as "Function A" with a start of run in frame 2 (S603). FIG. 14 shows an example of an end of a run within frame 2 where the sample run (S701) begins in frame 1 but ends as depicted by "Function A" in frame 2 (S702).

Figure 15:
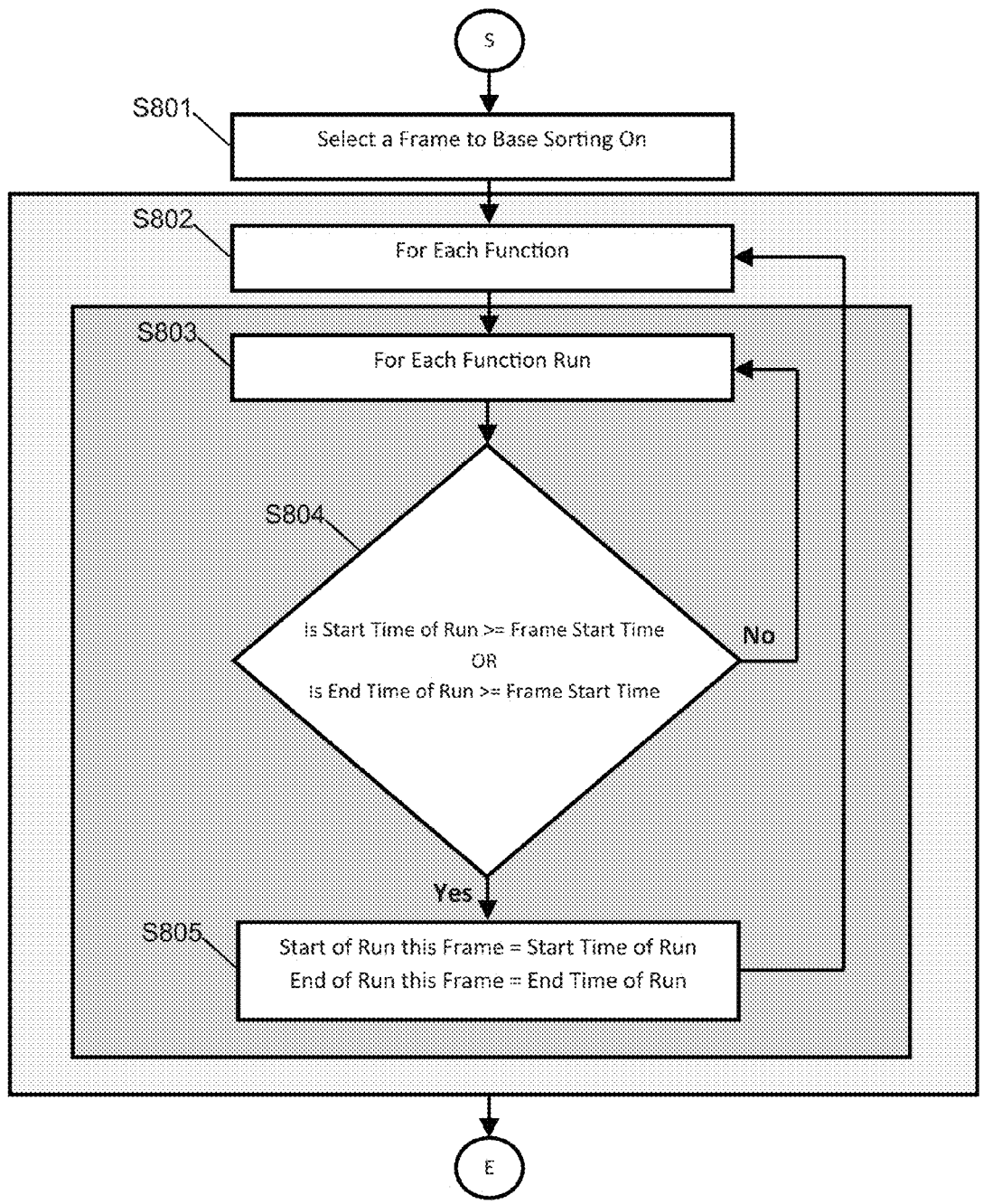
FIG. 15 illustrates an example embodiment of a flowchart for a process for detecting the start time and end time of a run for a particular frame for each function.

FIG. 15 shows a non-limiting example embodiment of a flowchart for a process for computing the start time and end time of a run for a particular frame for each function, as shown by example in FIGS. 13 and 14. The system 1 begins by, given the recorded frames, selecting a certain frame start time to base the chronological sorting (S801). For example, in FIG. 13 the start of frame 2 at 0.05 ms (S601) could be selected to base the chronological sorting.

The system 1 then, for each function (S802), examines each of the function's runs (S803). A run can be defined as a contiguous series of samples that include the same function. An example of a single run (S602) is shown in FIG. 13. For each run (S803), if the start time of the run is greater than or equal than the frame start time (for example, as shown in S603 of FIG. 13), or if the end time of the run is greater than or equal to the frame start time (for example, as shown in S702 of FIG. 14), then the system 1 assigns the function's "Start of Run this Frame" to the "Start Time of Run" and assigns the function's "End of Run this Frame" to the "End Time of Run" (S805). If neither of these tests are affirmative, the system 1 continues for each function run (S803). Once all of the functions have been examined (S802), the process is complete and all of the functions have been assigned time values for "Start of Run this Frame" and "End of Run this Frame."

Figure 16:
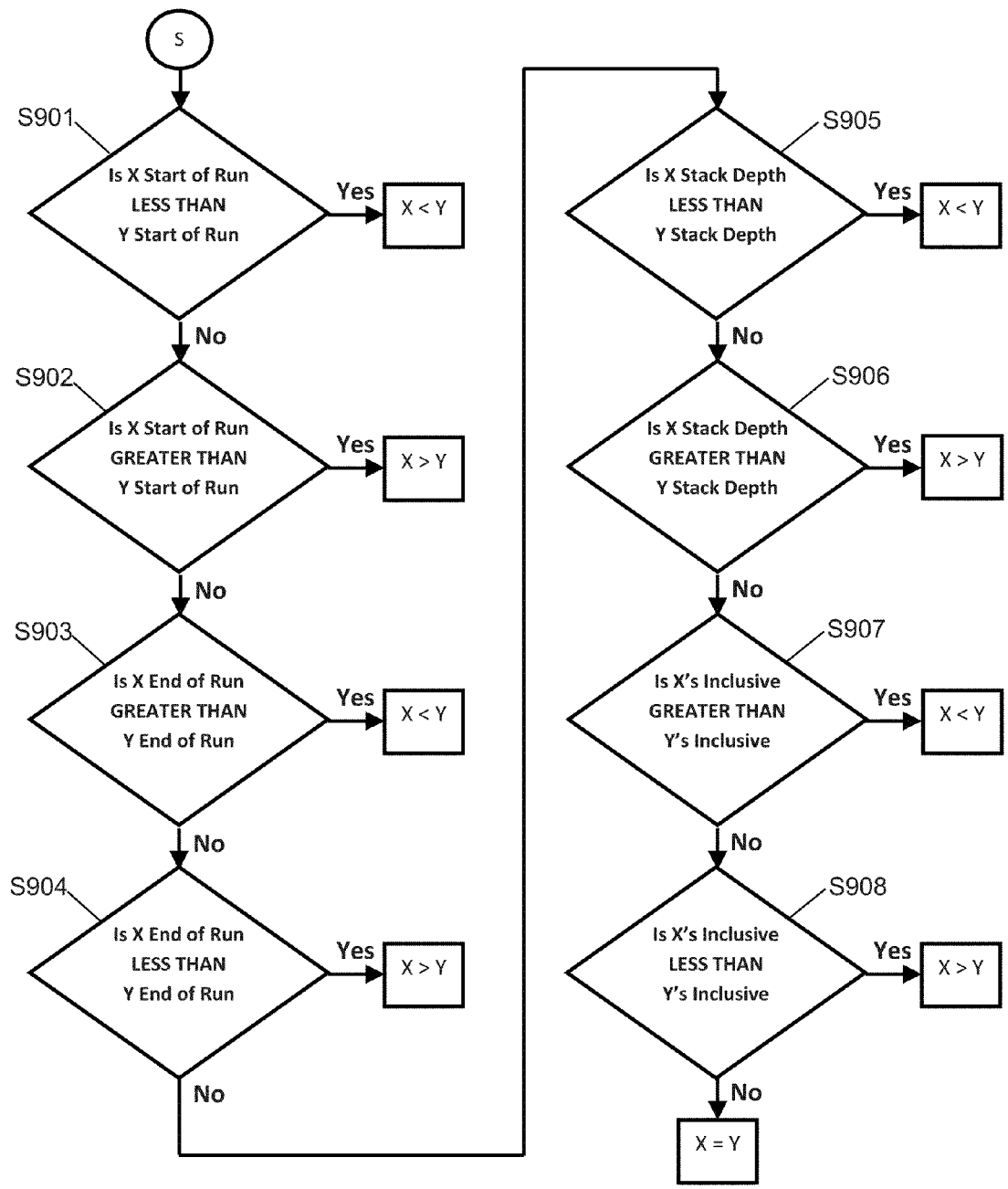
FIG. 16 depicts an example embodiment of a flowchart for a process of comparing two functions to create a sorted list.

FIG. 16 depicts a non-limiting example embodiment of a flowchart for a process of comparing two functions to create a sorted list. The processes determine how functions compare with each other and one of ordinary skill would understand that a list of items can be sorted if there is a method to compare any two items in the list. The examples shown in FIG. 16 show a first function (Function X) and a second function (Function Y). If Function X is less than Function Y, then Function X should appear in the final sorted list before Function Y and vice-versa. FIG. 16 depicts the process for comparing Function X and Function Y.

The system 1 begins by determining if the X start of the run is less than the Y start of the run (S901), then X<Y. Otherwise, the system 1 will determine if the X start of the run is greater than the Y start of run (S902), then X>Y. If X start of run is not greater than Y start of run, the system 1 determines if X end of run is greater than Y end of run (S903), then X<Y. If not, then the system 1 determines if X end of run is less than Y end of run (S904), then X>Y.

If the system 1 does not determine either for X end of run and Y end of run, the system 1 determines if X's stack depth in the call tree is less than Y's stack depth in the call tree (S905), then X<Y. If X's stack depth in the call tree is greater than Y's stack depth in the call tree (S906), then X>Y. If the system 1 does not determine either for X stack depth and Y stack depth, then the system 1 determines if X's number of inclusive samples is greater than Y's number of inclusive samples (S907), then X<Y. If X's number of inclusive samples is less than Y's number of inclusive samples (S908), then X>Y. If the system 1 does not determine for X and Y's number of inclusive samples which is greater, than X=Y.

While the technology has been described in connection with what is presently considered to be the most practical and preferred embodiment, it is to be understood that the technology is not to be limited to the disclosed embodiment, but on the contrary, is intended to cover various modifications and equivalent arrangements.

At least the following is claimed:

1. A method performed by at least one processor for analyzing video game execution, the method comprising:
   maintaining a record of execution of one or more functions of the video game during a frame of video game execution;
   selecting a subset of the one or more functions based on at least activity of the record of execution of the selected functions;
   sorting the selected subset of functions based on both chronological order of execution and hierarchical function calling relationships indicated by the record of function execution; and
   generating, using the at least one processor, a timeline display having a first axis for the selected and sorted subset of functions and having a second axis for graphically depicting function execution over time, the timeline display showing function clusters of video game execution over time in an order showing diagonally along the timeline display relative to the first and second axes.

2. The method according to claim 1, wherein the sample runs for each function are displayed in a first color when the function is being accessed for a portion of time during the frame of program execution and a second color when the function is not being accessed for the period of time during the frame of program execution.

3. A method implemented in an information processing apparatus having one or more processors for generating a code execution timeline, the method comprising:
   recording, from an interactive program executing one or more functions, execution histories of the one or more functions being accessed in the interactive program, the interactive program configured for execution on, at least, a video game system;
   sorting the functions based at least in part on a criteria related to function execution; and
   generating, via the one or more processors, a timeline display having a first axis for the sorted functions and having a second axis for graphically depicting function execution over time, the timeline display showing, at least, function clusters of program execution, associated with the interactive program, over time in an order showing diagonally along the timeline display relative to the first and second axes.

4. The method of claim 3, further comprising:
   displaying a list of functions on a first axis of the timeline display; and
   displaying, next to each respective function along a second axis of the timeline display, at least one execution event for each function in the list of functions, the generated timelines displayed such that the timelines contain the list of functions and the at least one execution event for each function.

5. The method of claim 4, further comprising:
   selecting a group of functions from the one or more functions;
   displaying the selected group of functions in the timeline display; and
   modifying the timeline display to remove display of one or more functions having similar execution from the selected group of functions.

6. The method of claim 5, wherein the one or more functions having similar execution call one or more similar child functions.

7. The method of claim 4, further comprising:
   selecting a representative group of functions from the one or more functions; and
   modifying the timeline display to exclude parent functions from the selected representative group of functions.

8. The method of claim 4, further comprising:
   selecting a representative group of functions from the one or more functions; and
   modifying the timeline display to include parent functions from the selected representative group of functions.

9. The method of claim 4, wherein each function in the timeline display can be displayed in a color different from at least one other function.

10. The method of claim 3, wherein the functions are sorted based on both a chronological order of execution and hierarchical function calling relationship indicated by the record of function execution.

11. A non-transitory computer-readable storage medium comprising instructions which, when executed by one or more processors of an information processing apparatus, cause the information processing apparatus to:
    record, from an interactive program executing one or more functions, execution histories of the one or more functions being accessed in the interactive program, the interactive program configured to execute on a system configured for video game functionality;
    sort and filter the functions based at least in part on a criteria related to function execution; and
    generate a timeline display having a first axis for the sorted and filtered functions and having a second axis for graphically depicting function execution over time, the timeline display showing, at least, function clusters of program execution, associated with the interactive program, over time in an order showing diagonally along the timeline display relative to the first and second axes.

12. The non-transitory computer-readable storage medium of claim 11, wherein the information processing apparatus is further caused to:
    display a list of functions on a first axis of the timeline display; and
    display, next to each respective function along a second axis of the timeline display, at least one execution event for each function in the list of functions, the generated timelines displayed such that the timelines contain the list of functions and the at least one execution event for each function.

13. The non-transitory computer-readable storage medium of claim 12, wherein the information processing apparatus is further caused to:
    select a group of functions from the one or more functions;

display the selected group of functions in the timeline display; and modify the timeline display to remove display of one or more functions having similar execution from the selected group of functions.

14. The non-transitory computer-readable storage medium of claim 13, wherein the one or more functions having similar execution call one or more similar child functions.

15. The non-transitory computer-readable storage medium of claim 12, wherein the information processing apparatus is further caused to:

select a representative group of functions from the one or more functions; and modify the timeline display to exclude parent functions from the selected representative group of functions.

16. The non-transitory computer-readable storage medium of claim 12, wherein the information processing apparatus is further caused to:

select a representative group of functions from the one or more functions; and modify the timeline display to include parent functions from the selected representative group of functions.

17. A system, comprising:

a processing system having a memory and one or more processors, the processing system configured to:

record, from an interactive program executing one or more functions, execution histories of the one or more functions being accessed in the interactive program, the interactive program configured for execution using an information processing system that is capable of providing video game functionality, selectively sort and filter the functions based at least in part on a criteria related to function execution, and generate a timeline display having a first axis for the sorted and filtered functions and having a second axis for graphically depicting function execution over time, the timeline display showing, at least, function clusters of program execution, associated with the interactive program, over time in an order showing diagonally along the timeline display relative to the first and second axes.

18. The system of claim 17, wherein the processing system is further configured to:

display a list of functions on a first axis of the timeline display; and display, next to each respective function along a second axis of the timeline display, at least one execution event for each function in the list of functions, the generated timelines displayed such that the timelines contain the list of functions and the at least one execution event for each function.

19. The system of claim 18, wherein the processing system is further configured to:

select a group of functions from the one or more functions;

display the selected group of functions in the timeline display; and modify the timeline display to remove display of one or more functions having similar execution from the selected group of functions.

20. The system of claim 19, wherein the one or more functions having similar execution call one or more similar child functions.

21. The system of claim 18, wherein the processing system is further configured to:

select a representative group of functions from the one or more functions; and modify the timeline display to exclude parent functions from the selected representative group of functions.

22. The system of claim 18, wherein the processing system is further configured to:

select a representative group of functions from the one or more functions; and modify the timeline display to include parent functions from the selected representative group of functions.

* * * * *